United States Patent
Nammi et al.

(10) Patent No.: US 11,201,702 B2
(45) Date of Patent: Dec. 14, 2021

(54) FACILITATING HYBRID AUTOMATIC REPEAT REQUEST RELIABILITY IMPROVEMENT FOR ADVANCED NETWORKS

(71) Applicant: AT&T Intellectual Property I, L.P., Atlanta, GA (US)

(72) Inventors: SaiRamesh Nammi, Austin, TX (US); Milap Majmundar, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 52 days.

(21) Appl. No.: 16/370,165

(22) Filed: Mar. 29, 2019

(65) Prior Publication Data

US 2020/0153565 A1   May 14, 2020

Related U.S. Application Data

(60) Provisional application No. 62/760,723, filed on Nov. 13, 2018.

(51) Int. Cl.
  *H04L 1/18* (2006.01)
  *H04W 72/04* (2009.01)
  *H04L 5/00* (2006.01)

(52) U.S. Cl.
  CPC .......... *H04L 1/1887* (2013.01); *H04L 5/0037* (2013.01); *H04W 72/048* (2013.01); *H04W 72/0413* (2013.01); *H04W 72/0446* (2013.01)

(58) Field of Classification Search
  CPC ...................................................... H04L 1/1887
  See application file for complete search history.

(56) References Cited

U.S. PATENT DOCUMENTS

| | | | |
|---|---|---|---|
| 10,135,591 B2 | 11/2018 | Chen et al. | |
| 2005/0207359 A1* | 9/2005 | Hwang | H04W 36/0055 370/278 |
| 2012/0115526 A1* | 5/2012 | Ogawa | H04B 1/713 455/509 |
| 2015/0319796 A1* | 11/2015 | Lu | H04B 7/2615 370/330 |

(Continued)

FOREIGN PATENT DOCUMENTS

| | | |
|---|---|---|
| GB | 2558564 A | 1/2017 |
| WO | 2018035247 A1 | 2/2018 |
| WO | 2018116051 A1 | 6/2018 |

*Primary Examiner* — Jason E Mattis
(74) *Attorney, Agent, or Firm* — Amin, Turocy & Watson, LLP

(57) ABSTRACT

Facilitating hybrid automatic repeat request reliability improvement for advanced networks (e.g., 4G, 5G, 6G, and beyond) is provided herein. Operations of a system can comprise obtaining information related to a capability of a user equipment device and configuring the user equipment device with respect to control channel resources and a number of repetitions per slot based on the capability of the user equipment device. The operations can also comprise indicating the control channel resources and the number of repetitions per slot to the user equipment device via a control channel. Further, the operations can comprise detecting an acknowledgement, from the user equipment device, via an uplink control channel that comprises the control channel resources.

20 Claims, 13 Drawing Sheets

(56) References Cited

U.S. PATENT DOCUMENTS

| | | |
|---|---|---|
| 2017/0041911 A1* | 2/2017 | Yamamoto ............ H04J 13/004 |
| 2017/0366311 A1 | 12/2017 | Iyer et al. |
| 2018/0049097 A1 | 2/2018 | Chen et al. |
| 2018/0167164 A1 | 6/2018 | Lin et al. |
| 2018/0220415 A1 | 8/2018 | Yin et al. |
| 2018/0227103 A1 | 8/2018 | Wang et al. |
| 2018/0234997 A1 | 8/2018 | Hosseini et al. |
| 2018/0324786 A1 | 11/2018 | Hooli et al. |
| 2019/0230683 A1* | 7/2019 | Akkarakaran .... H04W 72/1242 |
| 2019/0306852 A1* | 10/2019 | Nayeb Nazar .... H04W 72/0413 |
| 2019/0313342 A1* | 10/2019 | Papasakellariou .. H04W 52/146 |
| 2019/0349138 A1* | 11/2019 | Hosseini ............... H04L 1/1819 |
| 2020/0092068 A1* | 3/2020 | Yang .................... H04W 52/06 |

* cited by examiner

FIG. 6

FACILITATING HYBRID AUTOMATIC REPEAT REQUEST RELIABILITY IMPROVEMENT FOR ADVANCED NETWORKS

CROSS-REFERENCE TO RELATED APPLICATIONS

This application claims the benefit of U.S. Provisional Application Ser. No. 62/760,723, filed Nov. 13, 2018, and entitled "FACILITATING HYBRID AUTOMATIC REPEAT REQUEST RELIABILITY IMPROVEMENT FOR ADVANCED NETWORKS," the entirety of which is expressly incorporated herein by reference.

TECHNICAL FIELD

This disclosure relates generally to the field of mobile communication and, more specifically, to hybrid automatic repeat requests in wireless communication systems for advanced networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard and/or Sixth Generation (6G) standard for wireless communications. Unique challenges exist to provide levels of service associated with forthcoming 5G, 6G or other next generation, standards for wireless communication.

BRIEF DESCRIPTION OF THE DRAWINGS

Various non-limiting embodiments are further described with reference to the accompanying drawings in which:

FIG. 6 illustrates an example, non-limiting, schematic representation of the Hybrid Automatic Repeat Request Acknowledge repeated over multiple Physical Uplink Control Channel resources for Physical Uplink Control Channel format 1, in accordance with one or more embodiments described herein;

DETAILED DESCRIPTION

Figure 1:
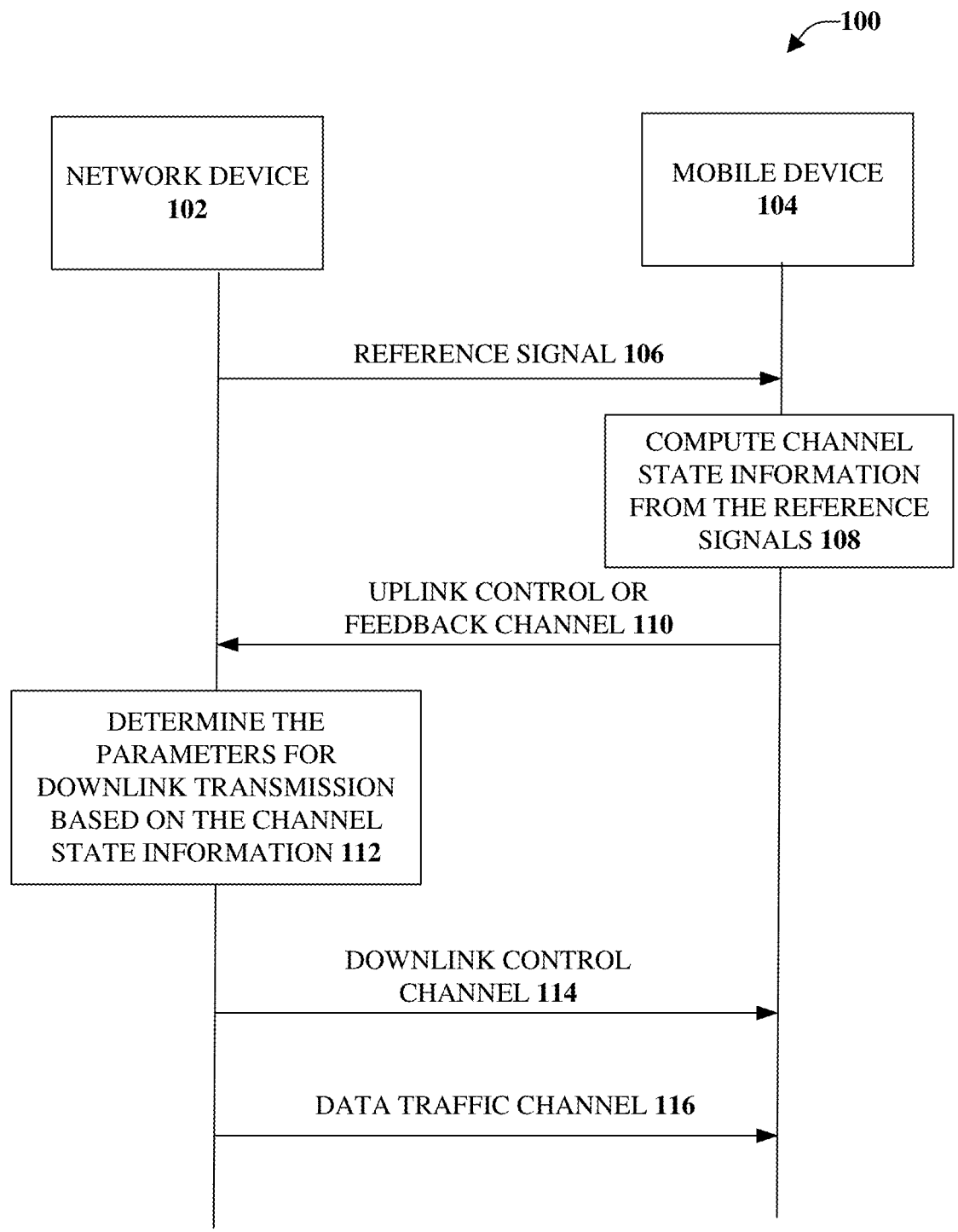
FIG. 1 illustrates an example, non-limiting, message sequence flow chart that can facilitate downlink data transfer in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details and without applying to any particular networked environment or standard.

Described herein are systems, methods, articles of manufacture, and other embodiments or implementations that can facilitate hybrid automatic repeat request reliability improvement for advanced networks (e.g., 5G, 6G, and beyond). More specifically described herein are aspects related to wireless communication systems and related to configuring an uplink control channel in advanced wireless systems for Ultra-Reliable Low-Latency Communication (URLLC) applications.

In an embodiment, described herein is a method that can comprise determining, by a network device of a group of network devices, the network device comprising a processor, that a mobile device is able to support multiple hybrid automatic repeat request acknowledgements within a slot. The method can also comprise configuring, by the network device, the mobile device with a first replication factor for a first physical uplink control channel format and a second replication factor for a second physical uplink control channel format.

According to some implementations, the method can comprise defining, by the network device, a group of resources for the mobile device based on a higher layer parameter resource group. Further to these implementations, the method can comprise indicating, by the network device, a number of resources in the group of resources based on a higher layer parameter resource group size. The method can also comprise transmitting, by the network device to the mobile device, resources in the group of resources via a higher layer parameter resource index. Alternatively, or additionally, the method can comprise facilitating, by the network device, a transmission of an indication of the group of resources via radio resource signaling.

In accordance with some implementations, the method can comprise configuring, by the network device, the mobile device with a maximum number of replication factors. The maximum number of replication factors can comprise at least the first replication factor and the second replication factor.

Configuring the mobile device with a first replication factor and the second replication factor can comprise, according to some implementations, transmitting a downlink control channel configured to operate according to a fifth generation wireless network communication protocol.

According to other embodiments, provided is a method that can comprise determining, by a mobile device comprising a processor, an acknowledgement signal based on a cyclic redundancy check determined for a first control channel. The method can also comprise applying, by the mobile device, a recommended format setting to a second control channel. Further, the method can comprise transmitting, by the mobile device, control information to a network device via an uplink control channel. The control information comprises the acknowledgement signal and a reference signal.

In an example, the acknowledgement signal can be a hybrid automatic repeat request acknowledgement. Further, the first control channel can be a physical downlink shared control channel.

In some implementations, the method can comprise, prior to the determining the acknowledgement signal, receiving, by the mobile device, a configuration parameter related to control channel resources. The configuration parameter can be received from the network device. Further to these implementations, the configuration parameter can comprise a parameter that indicates that a hybrid automatic repeat request acknowledgement is to repeat over multiple time resources and multiple frequency resources.

According to an example, the second control channel can be a physical uplink control channel In accordance with another example, the uplink control channel can comprise an uplink control channel configured to operate according to a fifth generation wireless network communication protocol.

Yet another embodiment relates to a system that can comprise a processor and a memory that stores executable instructions that, when executed by the processor, facilitate performance of operations. The operations can comprise obtaining information related to a capability of a user equipment device and configuring the user equipment device with respect to control channel resources and a number of repetitions per slot based on the capability of the user equipment device. The operations can also comprise indicating the control channel resources and the number of repetitions per slot to the user equipment device via a control channel. Further, the operations can comprise detecting an acknowledgement, from the user equipment device, via an uplink control channel that comprises the control channel resources. In an example, the control channel can be a control channel configured to operate according to a fifth generation wireless network communication protocol.

According to some implementations, obtaining the information can comprise obtaining ultra-reliable low-latency communication specific information supporting the user equipment device. In an example, the control channel resources can be physical uplink control channel resources.

In some implementations, the acknowledgement can comprise a hybrid automatic repeat request acknowledgement. Further to these implementations, the user equipment device can comprise configuring the user equipment device to cause the hybrid automatic repeat request acknowledgement to repeat over multiple time resources and multiple frequency resources.

According to some implementations, indicating the control channel resources can comprise transmitting the control channel resources to the user equipment device via a downlink control channel.

The acknowledgement can be a first acknowledgement, the control channel resources can be first control channel resources, and the operations can comprise combining the first acknowledgement with at least a second acknowledgement received over second control channel resources, resulting in a combined acknowledgement. The operations can also comprise, based on the combined acknowledgement, facilitating an improvement of a reliability metric related to a reliability of the control channel.

To meet the huge demand for data centric applications, 4G standards can be applied to 5G, also called New Radio (NR) access. For example, 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

There can be various services that 5G NR systems should satisfy. For example, 5G NR should provide Enhanced Mobile BroadBand (eMBB) services, which can be utilized for high broadband applications where the data rate is the main criteria. In another example, 5G NR should provide URLLC services, which can be used for ultra-reliable communications where the packet error rate of $10^{\wedge}(-5)$ is required with less delay. In yet another example, 5G NR should provide Massive Machine Type Communication (mMTC) services, which can be utilized for connecting machine type of communications, where the number of devices can be a criteria that should be considered.

A challenge faced by the mobile industry can be the increased demand on data rate, throughput, and capacity. With an ever-increasing need for more data, higher speeds fueled by new application design and service platform, network operators struggle to cope with the increased demand while using the current generation of mobile network technology, such as 3G and 4G. In an effort to meet these increasing demands, the mobile industry has started looking at higher frequency bands where the availability of large swaths of unused spectrum is available.

While some spectrum bands in higher frequency can hold the promise of more spectrum, the spectrum bands also come with significant challenges and hurdles. For example, an issue can be the poorer propagation that the radio waves experience in these high frequency bands. Propagation loss depends on the frequency with a 20 log 10(F) dependency. This implies that for every two times (2×) increase in the carrier frequency there is a 6 dB increase in the propagation loss.

With more adverse propagation conditions it is usually the UpLink (UL) that starts to become a challenge since the total transmit power is limited at the mobile device (or User Equipment (UE)). Some mobile devices have a total of 23 dBm (200 mWatts) and with improved UL waveform design and improved technology (e.g., with 5G) the power can be pushed to somewhere around 26-27 dBm (400-500 mWatts). However, this increase in power is not expected to be enough to meet with the adversity of the propagation conditions in higher frequency bands. Therefore, apart from higher power, other techniques, especially related to new physical layer design and advanced receiver designs, have been explored to overcome the propagation hurdles in high frequency bands.

A channel that should be preserved in the UL is the control channel, also referred to as Physical Uplink Control Channel (PUCCH). The PUCCH can carry various information such as the Hybrid Automatic Repeat Request Acknowledgement/Non-Acknowledgement (HARQ ACK/NACK) related to a DownLink (DL) transmission, CSI (Channel State Information) such as Channel Quality Indicator (CQI), Precoding Matrix Indicator (PMI), Rank Indicator (RI), Channel State Information Resource Indicator (CRI), and so on. Without the UL control channel, there is no way for the system to maintain any DL or UL data bearers, which is why the PUCCH can be designed to be robust.

Referring initially to FIG. 1, illustrated is an example, non-limiting, message sequence flow chart 100 that can facilitate downlink data transfer in accordance with one or more embodiments described herein. The message sequence flow chart 100 can be utilized for new radio, as discussed herein. As illustrated, the message sequence flow chart 100 represents the message sequence between a network device 102 (e.g., a General Node B, base station (gNB)) and a mobile device 104. As used herein, the term "network device 102" can be interchangeable with (or include) a network, a network controller or any number of other network components. One or more pilot signals and/or reference signals 106 can be transmitted from the network device 102 to the mobile device 104. The one or more pilot signals and/or reference signals 106 can be cell specific and/or user equipment specific signals. The one or more pilot signals and/or reference signals 106 can be beamformed or non-beamformed.

Based on the one or more pilot signals and/or reference signals 106, the mobile device 104 can compute the channel estimates and can compute the one or more parameters needed for channel state information (CSI) reporting, as indicated at 108. The CSI report can comprise, for example, Channel Quality Indicator (CQI), Precoding Matrix Index (PMI), Rank Information (RI), Channel State Information Reference Signal (CSI-RS) Resource Indicator (CRI the same as beam indicator), and so on, or any number of other types of information.

The CSI report can be sent from the mobile device 104 to the network device 102 via a feedback channel (e.g., uplink control or feedback channel 110). The CSI report can be sent on request from the network device 102, a-periodically, and/or the mobile device 104 can be configured to report periodically.

The network device 102, which can comprise a scheduler, can use the CSI report for choosing the parameters for scheduling of the particular mobile device 104. For example, as indicated at 112, the network device 102 can choose the parameters for downlink transmission based on the channel state information. The parameters for downlink transmission can include but are not limited to: Modulation and Coding Scheme (MCS), power, Physical Resource Blocks (PRBs), and so on.

The network device 102 can send the scheduling parameters to the mobile device 104 in a downlink control channel (e.g., downlink control channel 114). After the scheduling parameter information is transmitted, the actual data transfer can take place from the network device 102 to the mobile device 104 over the data traffic channel 116.

Downlink reference signals are predefined signals occupying specific resource elements within the downlink time-frequency grid. There are several types of downlink reference signals that are transmitted in different ways and used for different purposes by the receiving terminal (e.g., the mobile device 104). For example, downlink reference signals can include CSI reference signals (CSI-RS) and demodulation reference signals (DM-RS).

CSI reference signals are specifically intended to be used by terminals (e.g., the mobile device 104) to acquire channel-state information (CSI) and beam specific information (beam RSRP). In 5G, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

Other than the above-mentioned reference signals, there are other reference signals, namely phase tracking and tracking and sounding reference signals, which can be used for various purposes.

An uplink control channel carries information about Hybrid Automatic Repeat Request Acknowledgement (HARQ-ACK) information corresponding to the downlink data transmission, and channel state information. The channel state information can comprise CRI, RI, CQI, PMI, Layer Indicator, and so on. The CSI can be divided into two categories. A first category can be for subband and a second category can be for wideband. The configuration of subband and/or wideband CSI reporting can be performed through Radio Resource Control (RRC) signaling as part of CSI reporting configuration. Table 1 below illustrates example contents of an example CSI report for both wideband and subband. Specifically, Table 1 illustrates the contents of a report for PMI format indicator=Wideband, CQI format indicator=wideband and for PMI format indicator=subband, CQI format indicator=subband.

TABLE 1

| PMI-FormatIndicator = widebandPMI and CQI-FormatIndicator = widebandCQI | PMI-FormatIndicator = subbandPMI or CQI-FormatIndicator = subbandCQI | |
|---|---|---|
| | CSI Part II | |
| CSI Part I | wideband | Subband |
| CRI | Wideband CQI for the second TB | Subband differential CQI for the second TB of all even subbands |
| Rank Indicator | PMI wideband (X1 and X2) | PMI subband information |

TABLE 1-continued

| PMI-FormatIndicator = widebandPMI and CQI-FormatIndicator = widebandCQI | PMI-FormatIndicator = subbandPMI or CQI-FormatIndicator = subbandCQI | | |
|---|---|---|---|
| | CSI Part I | CSI Part II wideband | Subband |
| | | | fields X$_2$ of all even subbands |
| Layer Indicator | Layer Indicator | — | Subband differential CQI for the second TB of all odd subbands |
| PMI wideband (X1 and X2) | Wideband CQI | — | PMI subband information fields X$_2$ of all odd subbands |
| Wideband CQI | Subband differential CQI for the first TB | — | — |

It is noted that for NR, the subband can be defined according to the bandwidth part of the OFDM in terms of PRBs as shown in Table 2 below, which illustrates configurable subband sizes. The subband configuration can also be performed through RRC signaling.

TABLE 2

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

The downlink control channel (PDCCH) can carry information about the scheduling grants. This can comprise a number of Multiple Input, Multiple Output (MIMO) layers scheduled, transport block sizes, modulation for each codeword, parameters related to HARQ, subband locations, and so on. It is noted that all Downlink Control Information (DCI) formats do not need to use and/or transmit all the information as shown above. In general, the contents of PDCCH depends on transmission mode and DCI format.

In some cases, the following information can be transmitted by means of the DCI format: carrier indicator, identifier for DCI formats, bandwidth part indicator, frequency domain resource assignment, time domain resource assignment, Virtual Resource Block (VRB)-to-Physical Resource Block (PRB) mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port(s), transmission configuration indication, Sounding Reference Signal (SRS) request, Code Block Group (CBG) transmission information, CBG flushing out information, Demodulation Reference Signal (DMRS) sequence initialization, and so on.

NR defines about five PUCCH formats for reporting HARQ-ACK, SR, and CSI. Table 3 below summarizes the characteristics of each PUCCH format. Formats 0 and 1 only are used for sending HARQ-ACK. Long PUCCH formats are used for HARQ-ACK, CSI. It is noted that although the various aspects are discussed with respect to PUCCH format 0 and 1, the same or similar principles can be applied for other formats.

TABLE 3

| Format Name | Alternative name | Symbol length | Waveform | Information | Single UE/Multiple UE |
|---|---|---|---|---|---|
| Format 0 | Short PUCCH <=2 bits | 1-2 | CP-OFDM | HARQ-ACK, SR | Single UE |
| Format 1 | Long PUCCH <=2 bits | 4-14 | CP-OFDM | HARQ-ACK, SR | Single UE |
| Format 2 | Short PUCCH >2 bits | 1-2 | CP-OFDM | CSI | Single UE |
| Format 3 | Long PUCCH >2 bits | 4-14 | DFT-s-OFDM | CSI | Single UE |
| Format 4 | Long PUCCH >2 bits | 4-14 | DFT-s-OFDM | CSI | Multiple UEs |

Since the reliability for NR URLLC applications can be important for robust transmission of PDSCH, PUSCH, and HARQ-ACK is required. For example, Table 4 below shows the reliability requirement for some example, non-limiting, URLLC use cases.

TABLE 4

| Use case (Clause #) | Reliability (%) | End-to-end latency (ms) | # of UEs (per cell) | Data packet size | Description |
|---|---|---|---|---|---|
| Transport Industry | 99.999 | 5 | [30] (Note 1) | DL: [250] byte (Note 2) UL: [2572] byte (Note 3) | Remote driving |
| Power distribution | 99.9999 | 5 | [8] (Note 4) | [80] byte (Note 5) | Power distribution grid fault and outage management |
| | [99.999] (Note 6) | 15 | [8] (Note 4) | 250 byte | Differential protection |
| Factory automation | 99.9999 | 2 | 4 (Note 7) | 20 byte | Motion control |

Figure 2:
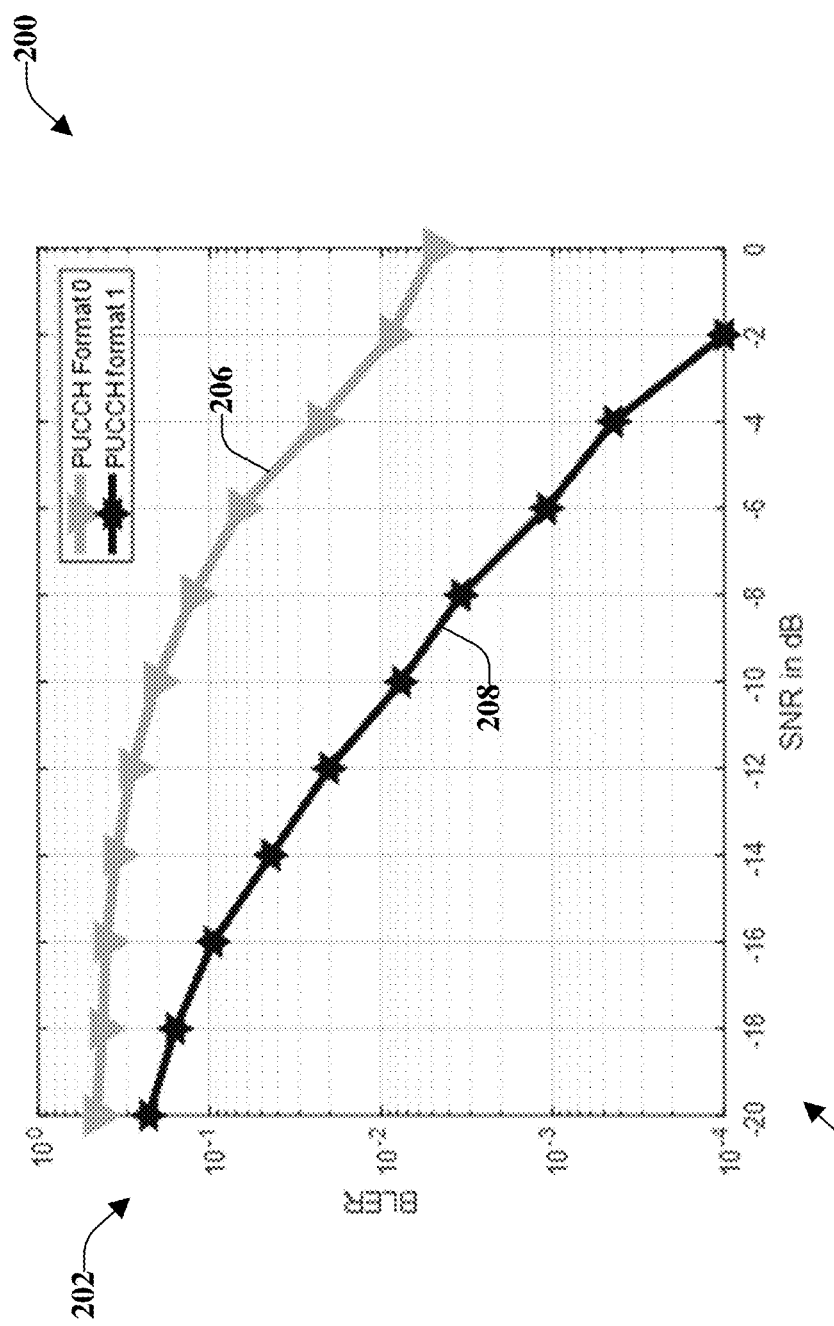
FIG. 2 illustrates an example, non-limiting, chart of a Block Error Rate comparison between Physical Uplink Control Channel format 0 and format 1 according to some embodiments.

It can be observed that for robust transmission of PDSCH, reliability of AHRQ-ACK is vital, for example, if the UE sends NACK and the network detects as HARQ-ACK, then the network does not (or cannot) retransmit the packet as the network device assumes the packet was properly received by the UE. Therefore, the system collapses and cannot meet the requirements set for the URLLC applications. For example, FIG. 2 illustrates an example, non-limiting, chart of a Block Error Rate (BLER) comparison between Physical Uplink Control Channel (PUCCH) format 0 and format 1 according to some embodiments. BLER is illustrated on the vertical axis 202 and the Signal to Noise Ratio (SNR) in decibels (dB) is illustrated on the horizontal axis 204. Further, the plot for PUCCH format 0 is illustrated by line 206 and the plot for PUCCH format 1 is illustrated by line 208. It can be observed that, for example, if the coverage is at −7 dB, the reliability of PUCCH format 0 is only 90% while PUCCH format 1 is about 99.8%. It is noted that these reliabilities cannot satisfy the requirements for NR URLLC applications (for example around 99.9999%). To address this as well as other issues, the disclosed aspects can provide for a robust transmission of HARQ-ACK for NR URLLC applications.

The various aspects provide a method, device, system, computer-readable medium, and other embodiments that can improve the performance (e.g., the reliability) of PUCCH for URLLC applications. According to various embodiments, a network (e.g., a network device) can configure a UE with multiple PUCCH resources and number of repetitions such that the UE repeats the HARQ-ACK over multiple time/frequency resources. The network (e.g., the network device) can indicate the resources dynamically. For example, the network device can indicate the resources for each HARQ-ACK as part of downlink control channel. The UE can repeat the HARQ-ACK information over the specified resources and can transmit to the network. The network can combine the HARQ-ACK over these resources and, thus, can improve the performance that is the reliability of the PUCCH.

Figure 3:
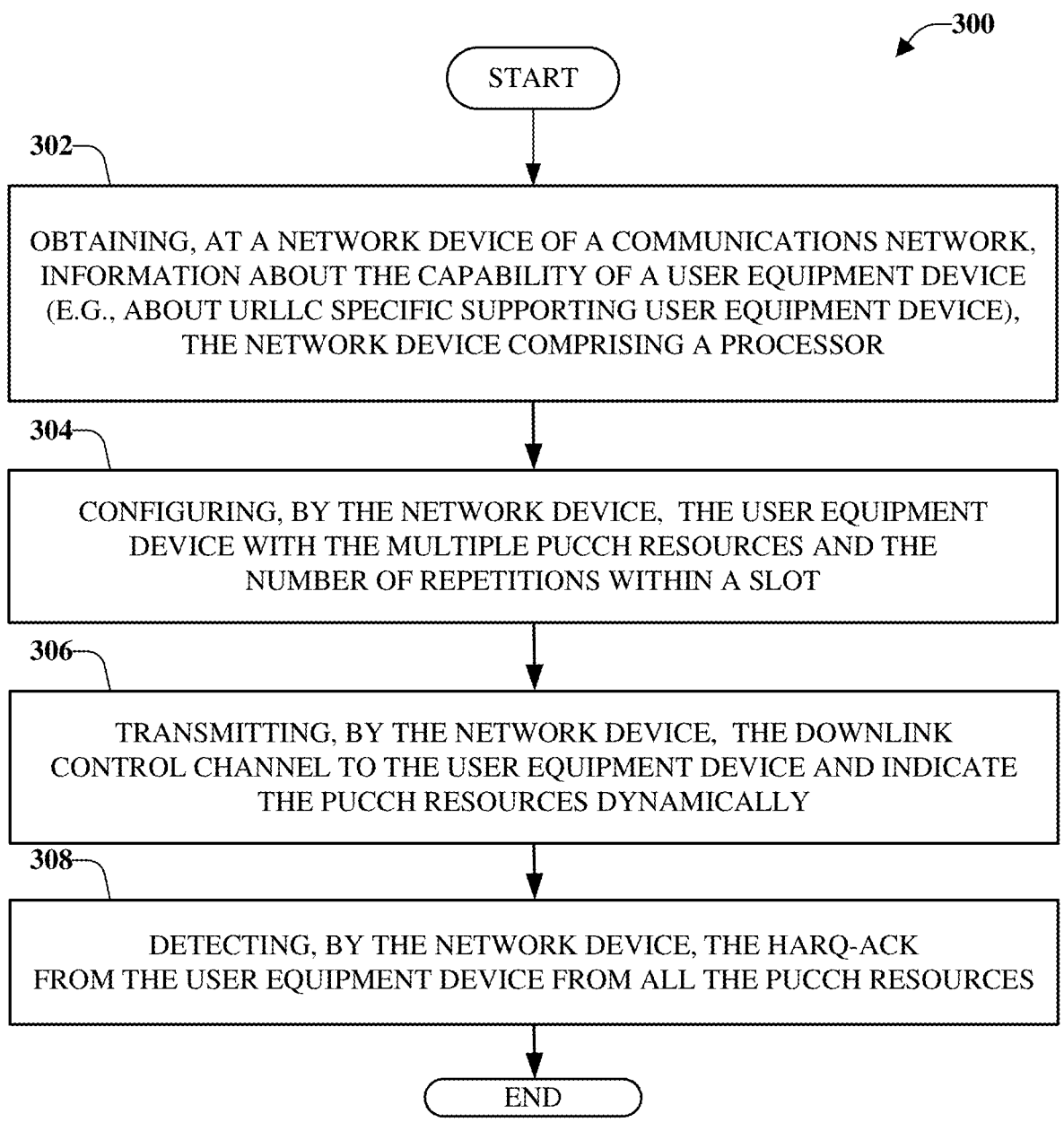
FIG. 3 illustrates a flowchart of an example, non-limiting, method for configuring a mobile device for advanced networks in accordance with one or more embodiments described herein.

For example, FIG. 3 illustrates a flowchart of an example, non-limiting, method 300 for configuring a mobile device for advanced networks in accordance with one or more embodiments described herein. Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Although FIG. 3 is illustrated and described with respect to a specific implementation (e.g., a network device), the disclosed aspects are not limited to this implementation. In some implementations, a system comprising a processor can perform the method 300 and/or other methods discussed herein. In other implementations, a device comprising a processor can perform the method 300 and/or other methods discussed herein. In other implementations, a machine-readable storage medium, can comprise executable instructions that, when executed by a processor, facilitate performance of operations, which can be the operations discussed with respect to the method 300 and/or other methods discussed herein.

The method 300 starts, at 302, when a network device comprising a processor can obtain information about the capability of a UE. The network device can be a network device of a group of network devices in a communications network. For example, the information can comprise information about URLLC specific supporting UE.

Further, at 304, the network device can configure the UE with the multiple PUCCH resources and the number of repetitions within a slot. At 306, the network device can transmit the downlink control channel to the UE and indicate the PUCCH resources dynamically. Further, at 308, the network device can detect the HARQ-ACK from the UE from all the PUCCH resources. Further details related to the method 300 will be provided below.

Figure 4:
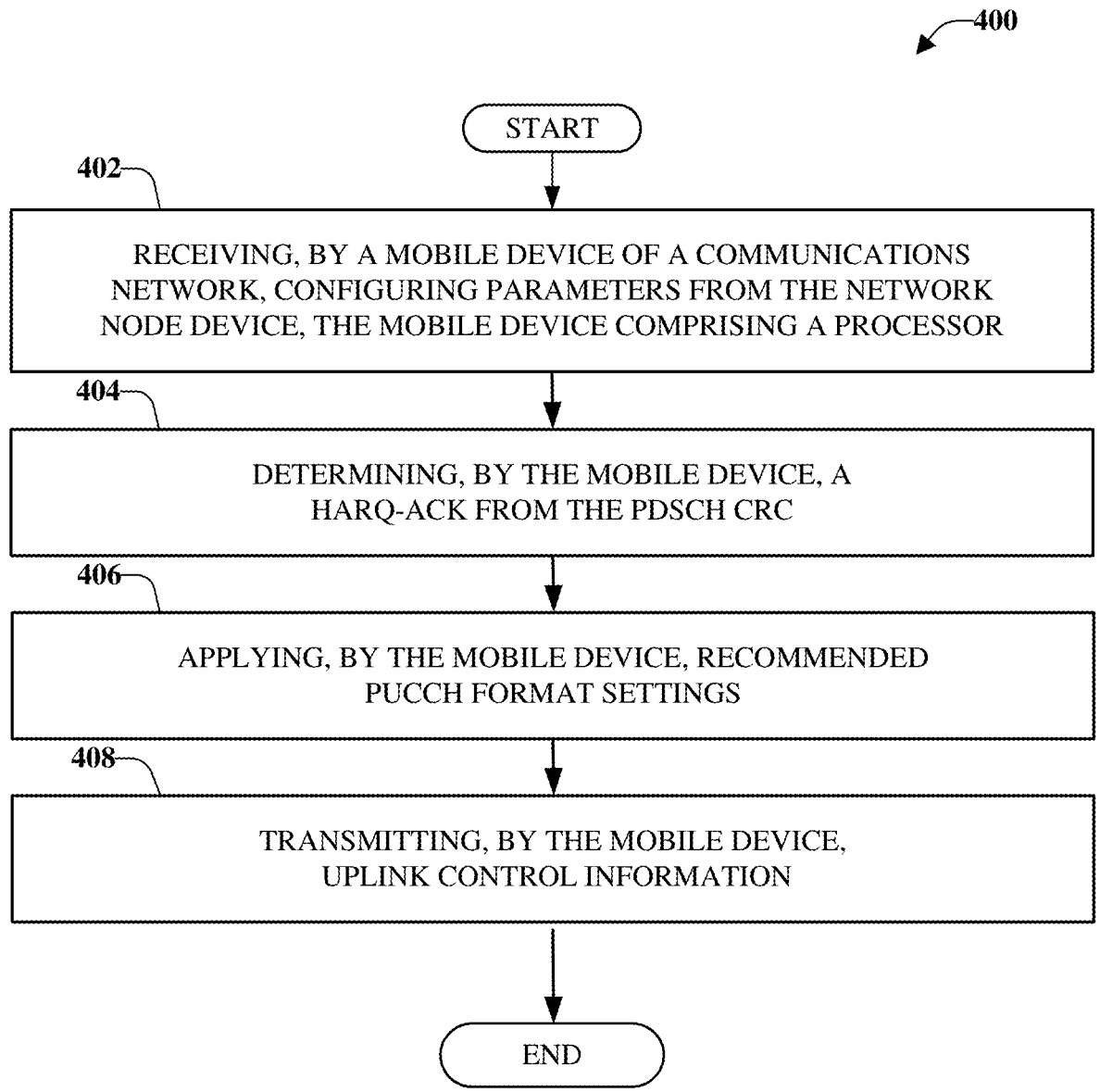
FIG. 4 illustrates a flowchart of an example, non-limiting, method for facilitating transmission of a hybrid automatic repeat request acknowledgement and reference signal to a network device for advanced networks in accordance with one or more embodiments described herein.

FIG. 4 illustrates a flowchart of an example, non-limiting, method 400 for facilitating transmission of a hybrid automatic repeat request acknowledgement and reference signal to a network device (e.g., a gNodeB) for advanced networks in accordance with one or more embodiments described herein.

Although FIG. 4 is illustrated and described with respect to a specific implementation (e.g., a mobile device), the disclosed aspects are not limited to this implementation. In some implementations, a system comprising a processor can perform the method 400 and/or other methods discussed herein. In other implementations, a device comprising a processor can perform the method 400 and/or other methods discussed herein. In other implementations, a machine-readable storage medium can comprise executable instructions that, when executed by a processor, facilitate performance of operations, which can be the operations discussed with respect to the method 400 and/or other methods discussed herein.

The method 400 starts, at 402, when a mobile device of a communications network can receive configuration parameters from a network node (e.g., a network device, a gNodeB, and so on). The mobile device can comprise a processor.

At 404, the mobile device can determine the HARQ-ACK from the PDSCH Cyclic Redundancy Check (CRC). Further, the mobile device can apply the recommended PUCCH format settings, at 406. The uplink control information can be transmitted by the mobile device at 408. Further details related to the method 400 will be provided below.

The various embodiments provided herein can allow for better detection capability for uplink control channel. Accordingly, the various embodiments can achieve significant gain in block error rate for PUCCH. This in turn can improve the NR coverage, which can allow for a robust performance of the UL control channel even at low SINR conditions. The various embodiments can be attractive for URLLC applications which can demand high reliability for all SNRs.

In some embodiments, the non-limiting term radio network node or simply network node is used and it refers to any type of network node serving UE and/or connected to other network nodes or network elements or any radio node from where a UE receives signal. Examples of radio network nodes are Node B, Base Station (BS), Multi-Standard Radio (MSR) radio node such as MSR BS, gNodeB, eNode B, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS) system, and so on.

In some embodiments the non-limiting term user equipment (UE) is used and it refers to any type of wireless device communicating with a radio network node in a cellular or mobile communication system. Examples of UE are target device, device to device (D2D) UE, machine type UE or UE capable of machine to machine (M2M) communication, PDA, iPad, tablet, mobile terminals, smart phone, laptop embedded equipped (LEE), laptop mounted equipment (LME), USB dongles etc.

The various embodiments are described in particular for NR. The various embodiments are however applicable to any RAT or multi-RAT system where the UE operates using multiple carriers (e.g. LTE FDD/TDD, GSM/GERAN, Wi Fi, WLAN, WiMax, CDMA2000 etc.)

The embodiments are applicable to single carrier as well as to multicarrier (MC) or carrier aggregation (CA) operation of the UE in conjunction with MIMO in which the UE is able to receive and/or transmit data to more than one serving cells using MIMO. The term carrier aggregation (CA) is also called (e.g. interchangeably called) "multi-carrier system," "multi-cell operation," "multi-carrier operation," "multi-carrier" transmission and/or reception.

It is noted that the various embodiments discussed herein equally apply for Multi RAB (radio bearers) on some carriers (e.g., data plus speech is simultaneously scheduled).

The various aspects can comprise the following aspects and embodiments. Provided herein is a system, device, method, machine-readable storage medium, other embodiments, and/or other implementations that can facilitate, at a network node (e.g., a network node device), transmission of configuration parameters and/or that can facilitate transmission of a DCI. Also provided is a system, device, method, machine-readable storage medium, other embodiments, and/or other implementations that can facilitate, at a mobile device, transmission of the HARQ-ACK. Further, provided herein is a system, device, method, machine-readable storage medium, other embodiments, and/or other implementations that can facilitate, at a network node, detection of the HARQ-ACK transmitted by the mobile device.

Figure 5:
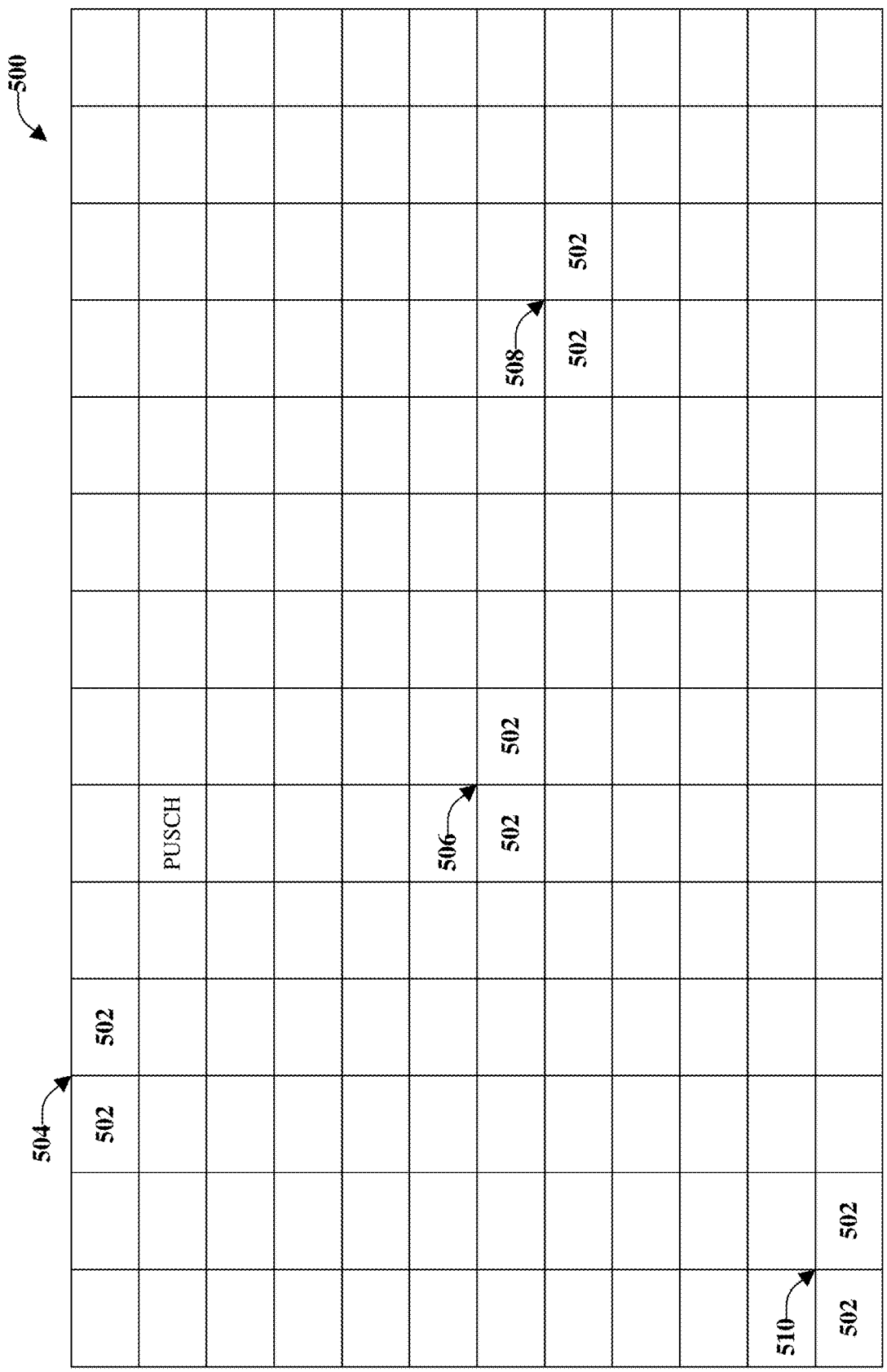
FIG. 5 illustrates an example, non-limiting, schematic representation of a Hybrid Automatic Repeat Request Acknowledge repeated over multiple Physical Uplink Control Channel resources for Physical Uplink Control Channel format 0 in accordance with one or more embodiments described herein.

Various aspects relate to the principle that, rather than using single PUCCH resource for transmitting HARQ-ACK, the network (e.g., the network node) configures the UE with multiple PUCCH resources such that the UE can repeat the HARQ-ACK information over these elements within a slot. It is noted that this is different compared to the multi slot PUCCH where the same information is repeated over multiple slots. However, in this case (e.g., with the disclosed aspects) the same information can be repeated over multiple resources. For example, FIG. 5 illustrates an example, non-limiting, schematic representation 500 of the HARQ-ACK repeated over multiple PUCCH resources for PUCCH format 0 in accordance with one or more embodiments described herein. Further, FIG. 6 illustrates an example, non-limiting, schematic representation 600 of the HARQ-ACK repeated over multiple PUCCH resources for PUCCH format 1, in accordance with one or more embodiments described herein.

FIG. 5 illustrates that the same HARQ-ACK 502 can be repeated four times for PUCCH format 0 over multiple PUCCH resources in accordance with one or more embodiments described herein. For example, as illustrated in FIG. 5, the HARQ-ACK 502 is sent once at 504, a second time at 506, a third time at 508, and a fourth time at 510. At the receiver, the network node can determine the HARQ-ACK by taking into consideration all these PUCCH resources (e.g., at 504, 506, 508, and 510), thereby improving the reliability. Note that the minimum gain is given by 10 Log(N), where N is the number of times the HARQ-ACK is repeated within a slot.

Figure 6:
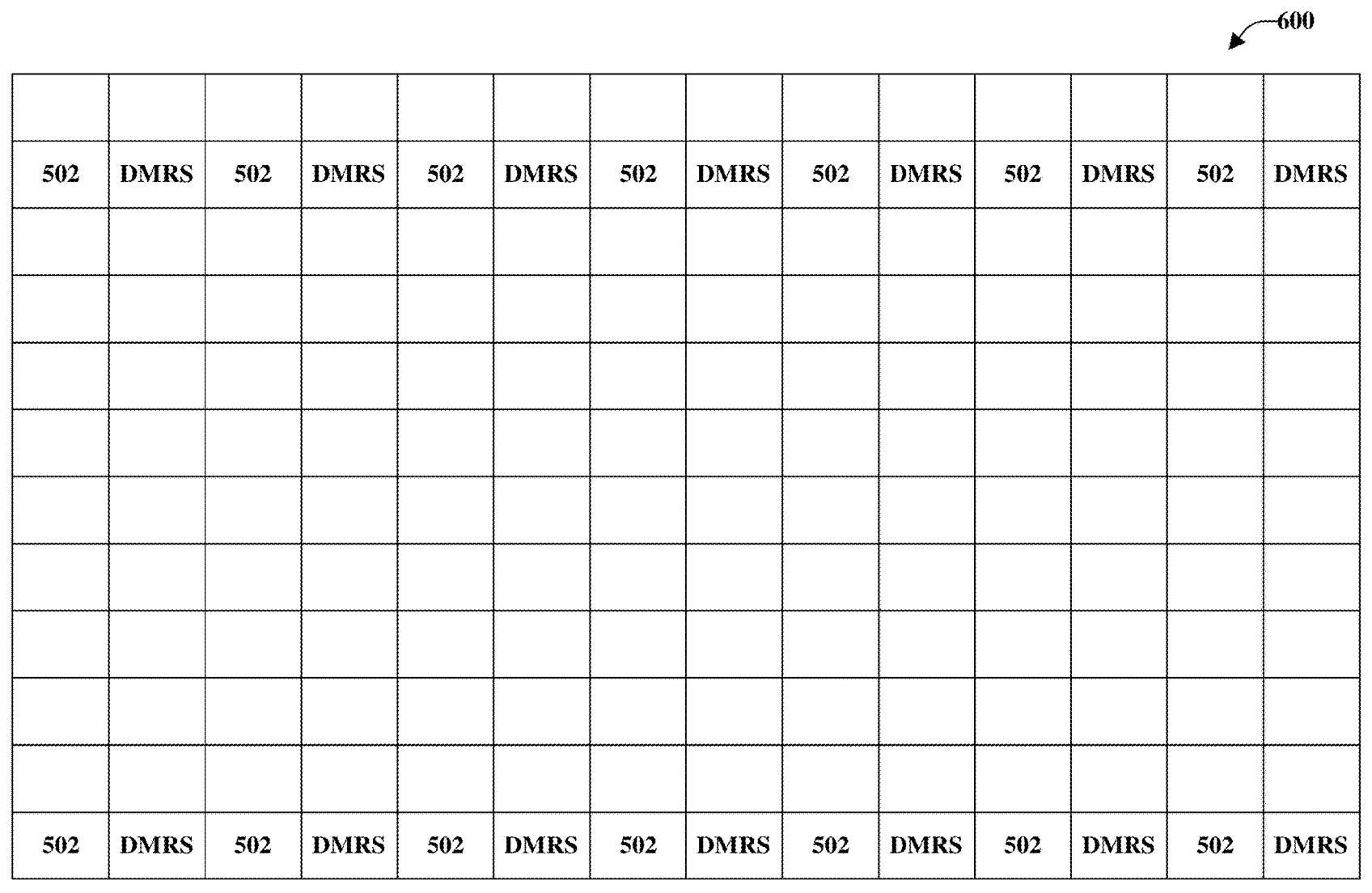

In a similar manner, FIG. 6 illustrates that the HARQ-ACK 502 repetition over multiple slots for PUCCH format 1. In this case only two repetitions are illustrated and in this case two repetitions provides gain.

According to the one or more embodiments, the network device can obtain information about the UE capability. For example, the information can be whether the UE can support multiple HARQ-ACK within a slot or not. In another example, the information can be whether the UE is capable of supporting URLLC applications, and so on. Upon or after the network device obtains information about the UE capability, the network device can configure the UE with a repletion factor for each PUCCH format. For example, the factor N can be 4 for PUCCH format 0 and 2 for PUCCH format 1, value equal to 2 for PUCCH format 2, and so on. The network device can limit the maximum number of repetitions. According to some implementations, the network device can limit the maximum number of repetitions to a value of eight. However, the disclosed aspects are not limited to this value and other values can be utilized. In addition, the network device can define a set of PUCCH resources for the UE.

A PUCCH resource can include one or more of the following parameters: an index of the first symbol; a number of OFDM symbols; an index of the first PRB prior to frequency hopping or for no frequency hopping; an index of the first PRB after frequency hopping; a number of PRBs; frequency hopping (e.g., frequency hopping for a PUCCH resource is either enabled or disabled); an index of the cyclic shift; an index of an orthogonal cover code; and/or a spreading factor for an orthogonal cover code.

A UE can be configured a number of sets of PUCCH resources by higher layer parameter PUCCH-resource-set, where the number of PUCCH resources in each set of PUCCH resources can be provided by higher layer parameter PUCCH-resource-set-size and where a PUCCH resource in a set of PUCCH resources can be indicated by higher layer parameter PUCCH-resource-index. It is noted that all or some of these parameters can be sent using RRC signaling.

Figure 7:
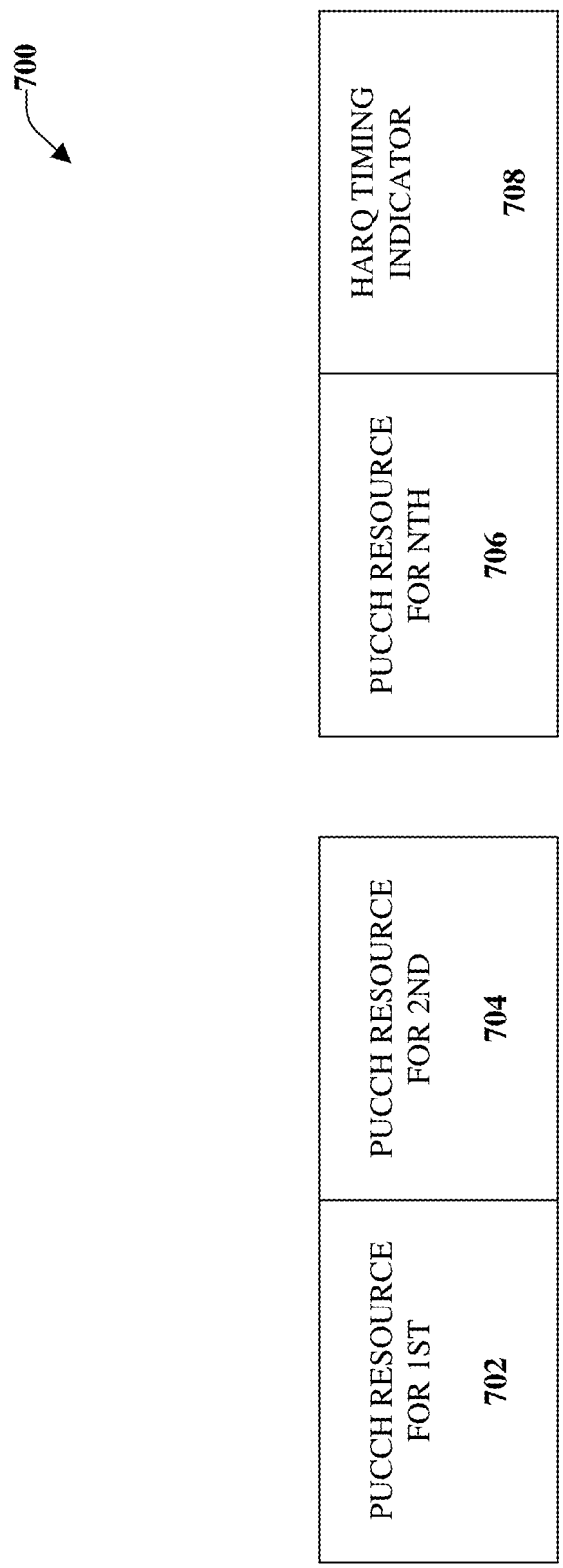
FIG. 7 illustrates a portion of an example, non-limiting, downlink control channel in accordance with one or more embodiments described herein.

According to the disclosed aspects, the network device can configure the UE with multiple PUCCH resources and the repetition factor within a slot. Upon or after the time of scheduling, the network device can indicate the PUCCH resources for each of the repetition HARQ-ACK in the downlink control channel as depicted in FIG. 7, which illustrates a portion of an example, non-limiting, downlink control channel 700 in accordance with one or more embodiments described herein.

As illustrated, the downlink control channel 700 can comprise a PUCCH resource for first HARQ-ACK 702, a PUCCH resource for second HARQ-ACK 704, through a PUCCH resource for Nth HARQ-ACK 706, where N is an integer. The downlink control channel can also comprise a HARQ timing indicator 708.

Figure 8:
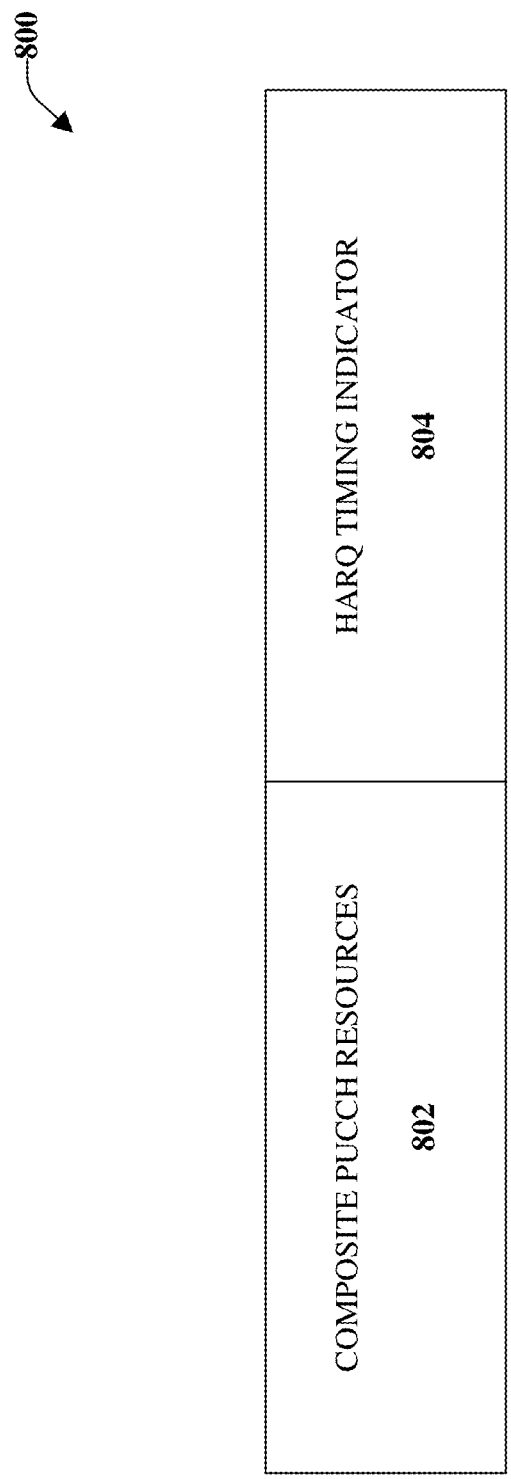
FIG. 8 illustrates another example, non-limiting downlink control channel in accordance with one or more embodiments described herein.

According to another implementation, the network device can pre-define the PUCCH resources for N repetitions and can configure the UE with RRC signaling. At the time of scheduling, the network device can indicate the combination via downlink control channel. For example, FIG. 8 illustrates another example, non-limiting, downlink control channel 800 in accordance with one or more embodiments described herein. As illustrated, the downlink control channel 800 can comprise composite PUCCH resources 802. Further, the downlink control channel 800 can comprise a HARQ timing indicator 804.

Upon or after the UE receives the DCI and the PDSCH, the UE can check the CRC and can determine the HARQ-ACK (e.g., HARQ-ACK or HARQ-NAK). The UE can then repeat the same sequence over the multiple PUCCH resources as indicated by the network device.

Figure 9:
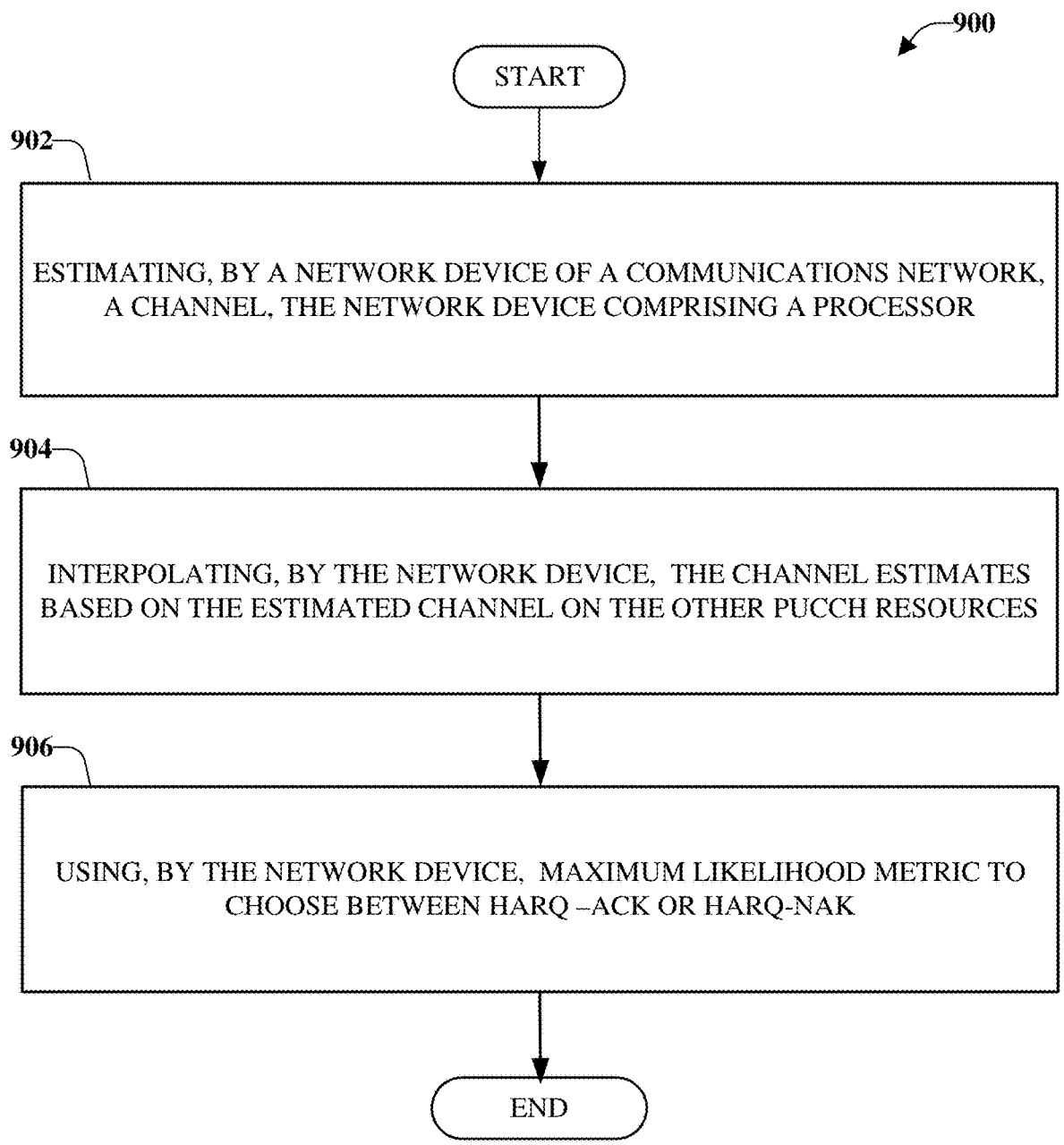
FIG. 9 illustrates a flowchart of an example, non-limiting, method for determining the Hybrid Automatic Repeat Request Acknowledge at a network device for advanced networks in accordance with one or more embodiments described herein.

FIG. 9 illustrates a flowchart of an example, non-limiting, method 900 for determining the HARQ-ACK at the network device for advanced networks in accordance with one or more embodiments described herein.

Although FIG. 9 is illustrated and described with respect to a specific implementation (e.g., a network device), the disclosed aspects are not limited to this implementation. In some implementations, a system comprising a processor can perform the method 900 and/or other methods discussed herein. In other implementations, a device comprising a processor can perform the method 900 and/or other methods discussed herein. In other implementations, a machine-readable storage medium, can comprise executable instructions that, when executed by a processor, facilitate performance of operations, which can be the operations discussed with respect to the method 900 and/or other methods discussed herein.

At 902, the network device can estimate the channel. For PUCCH format 0, the network node can estimate the channel on the common resource elements for HARQ-ACK and HARQ-NAK. Alternatively, or additionally, for PUCCH format 1, the network device can use the DMRS to estimate the channel. Further, at 904, the network device can interpolate the channel estimates based on the estimated channel on the other PUCCH resources.

Upon or after the channel estimation of PUCCH resources is completed, at 906, the network device can use maximum likelihood metric to choose between HARQ-ACK or HARQ-NAK. For example, the following can be utilized by the network node:

$$z1=\|R-Hx\|^2$$

$$z2=\|R-Hx2\|^2$$

If z1<z2, HARQ-ACK was chosen, else HARQ-NAK will be selected. In the above equation, R is the received signal, H is the channel estimated from the reference signal (and interpolated), x1 is the CAZAC sequence corresponding to the HARQ-ACK, and x2 is the CAZAC sequence corresponding to HARQ-NAK.

Note that here z1 and z2 are the column vectors where the received signal is stacked over all the PUCCH resources, similarly H is the channel stacked over all the PUCCH resources.

Figure 10:
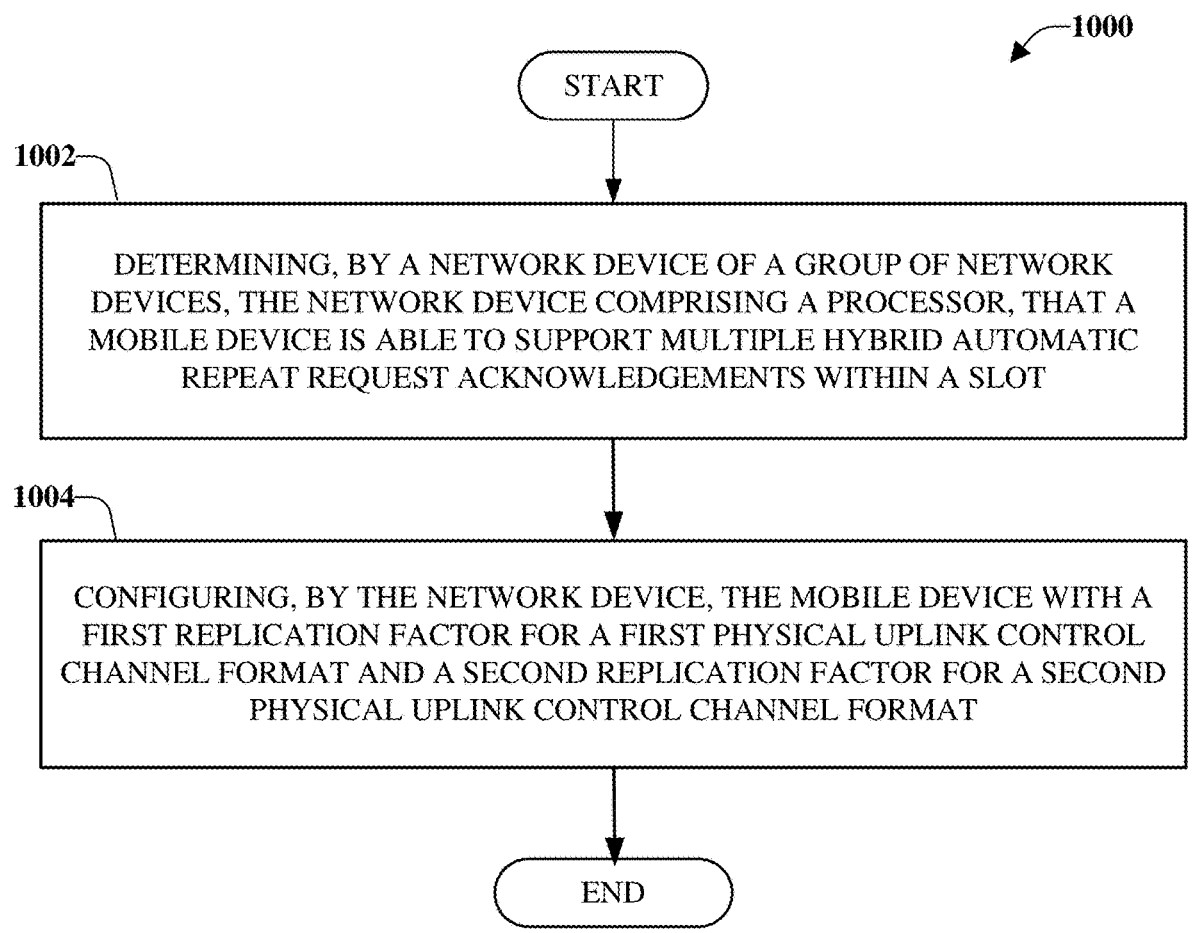
FIG. 10 illustrates a flow diagram of an example, non-limiting, computer-implemented method that facilitates improvements to Hybrid Automatic Repeat Request Acknowledge reliability for advanced networks in accordance with one or more embodiments described herein.

FIG. 10 illustrates a flow diagram of an example, non-limiting, computer-implemented method 1000 that facilitates improvements to HARQ-ACK reliability for advanced networks in accordance with one or more embodiments described herein.

In some implementations, a system comprising a processor can perform the computer-implemented method 1000 and/or other methods discussed herein. In other implementations, a device comprising a processor can perform the computer-implemented method 1000 and/or other methods discussed herein. In other implementations, a machine-readable storage medium, can comprise executable instructions that, when executed by a processor, facilitate performance of operations, which can be the operations discussed with respect to the computer-implemented method 1000 and/or other methods discussed herein. In further implementations, a computer readable storage device comprising executable instructions that, in response to execution, cause a system comprising a processor to perform operations, which can be operations discussed with respect to the computer-implemented method 1000 and/or other methods discussed herein.

At 1002 of the computer-implemented method 1000, a network device operatively coupled to one or more processors, can determine that a mobile device is able to support multiple hybrid automatic repeat request acknowledgements within a slot. Further, at 1004 of the computer-implemented method 1000, the network device can configure the mobile device with a first replication factor for a first physical uplink control channel format and a second replication factor for a second physical uplink control channel format. Configuring the mobile device can comprise transmitting a downlink control channel configured to operate according to a fifth generation wireless network communication protocol.

According to some implementations, the computer-implemented method 1000 can comprise defining, by the network device, a group of resources for the mobile device based on a higher layer parameter resource group. Further to these implementations, the computer-implemented method 1000 can comprise indicating, by the network device, a number of resources in the group of resources based on a higher layer parameter resource group size and transmitting, by the network device to the mobile device, resources in the group of resources via a higher layer parameter resource index. Alternatively, or additionally, the computer-implemented method 1000 can comprise facilitating, by the network device, a transmission of an indication of the group of resources via radio resource signaling.

In accordance with some implementations, the computer-implemented method 1000 can comprise configuring, by the network device, the mobile device with a maximum number of replication factors. The maximum number of replication factors can comprise at least the first replication factor and the second replication factor.

Figure 11:
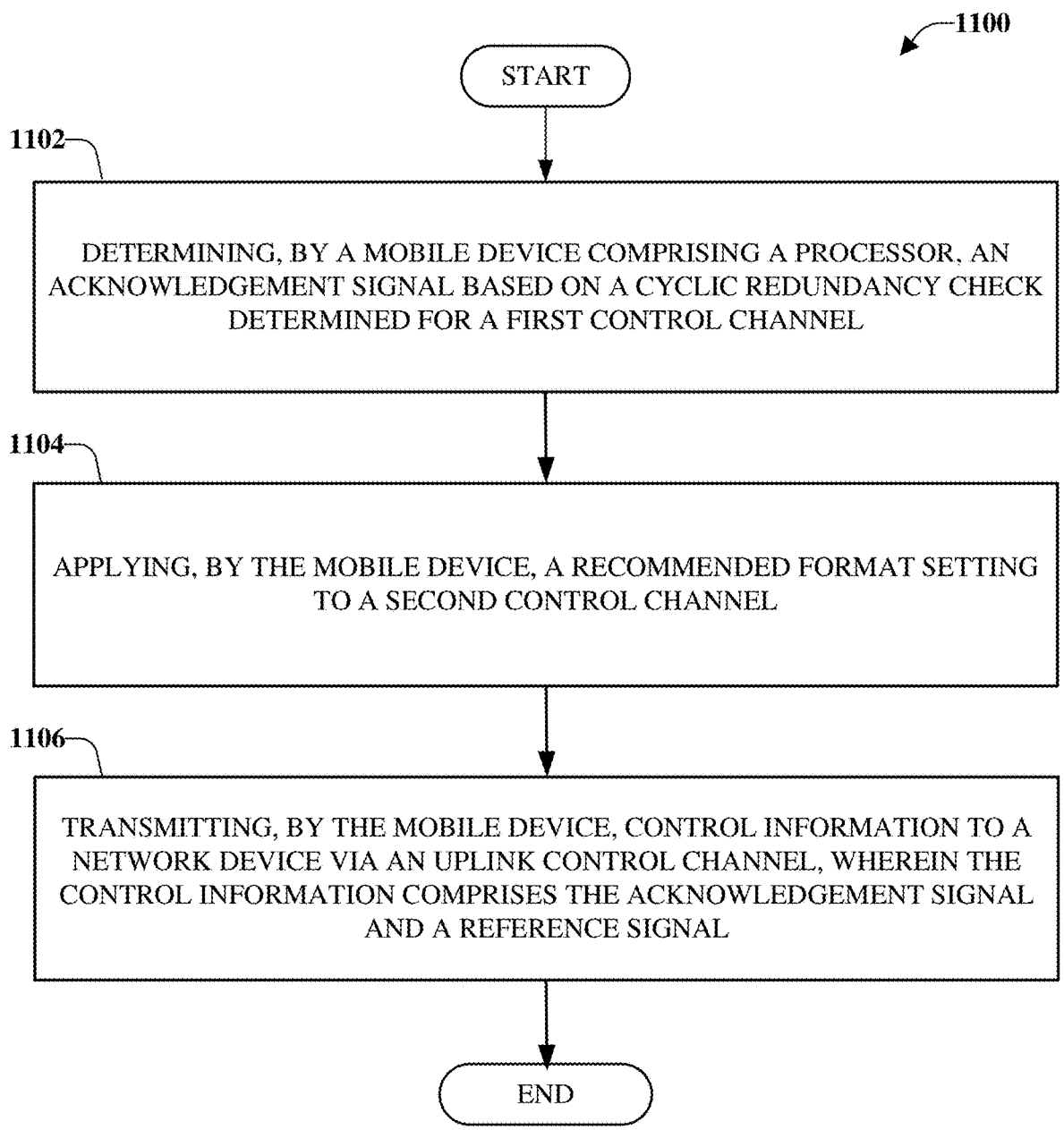
FIG. 11 illustrates a flow diagram of another example, non-limiting, computer-implemented method that facilitates improvements to Hybrid Automatic Repeat Request Acknowledge reliability for advanced networks in accordance with one or more embodiments described herein.

FIG. 11 illustrates a flow diagram of another example, non-limiting, computer-implemented method 1100 that facilitates improvements to HARQ-ACK reliability for advanced networks in accordance with one or more embodiments described herein.

In some implementations, a system comprising a processor can perform the computer-implemented method 1100 and/or other methods discussed herein. In other implementations, a device comprising a processor can perform the computer-implemented method 1100 and/or other methods discussed herein. In other implementations, a machine-readable storage medium, can comprise executable instructions that, when executed by a processor, facilitate performance of operations, which can be the operations discussed with respect to the computer-implemented method 1100 and/or other methods discussed herein. In further implementations, a computer readable storage device comprising executable instructions that, in response to execution, cause a system comprising a processor to perform operations, which can be operations discussed with respect to the computer-implemented method 1100 and/or other methods discussed herein.

At 1102 of the computer-implemented method 1100, a mobile device comprising a processor can determine an acknowledgement signal based on a cyclic redundancy check determined for a first control channel. Further, at 1104 of the computer-implemented method 1100, the mobile device can apply a recommended format setting to a second control channel. At 1106 of the computer-implemented method 1100, the mobile device can transmit control information to a network device via an uplink control channel. The control information can comprise the acknowledgement signal and a reference signal.

According to some implementations, the acknowledgement signal can be a hybrid automatic repeat request acknowledgement, and the first control channel can be a physical downlink shared control channel. The second control channel can be a physical uplink control channel. Further, the uplink control channel comprises an uplink control channel configured to operate according to a fifth generation wireless network communication protocol.

In some implementations, prior to determining the acknowledgement signal, the mobile device can receive a configuration parameter related to control channel resources. The configuration parameter can be received from the network device. Further to these implementations, the configuration parameter can comprise a parameter that indicates that a hybrid automatic repeat request acknowledgement is to repeat over multiple time resources and multiple frequency resources.

Described herein are systems, methods, articles of manufacture, and other embodiments or implementations that can facilitate hybrid automatic repeat request reliability improvement in advanced networks. Facilitating hybrid automatic repeat request reliability improvement for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 12:
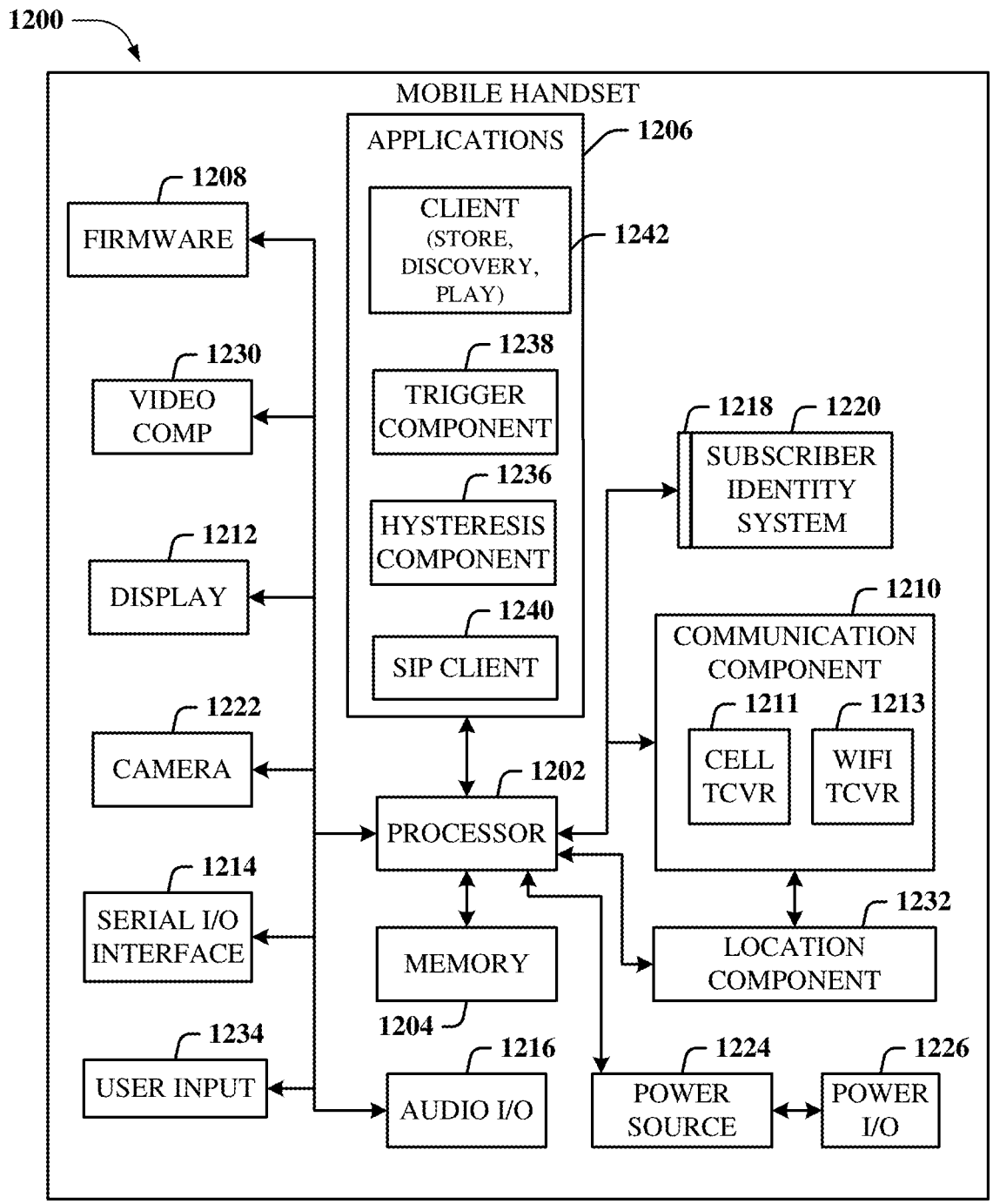
FIG. 12 illustrates an example block diagram of an example mobile handset operable to engage in a system architecture that facilitates wireless communications according to one or more embodiments described herein.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hard-wire connection, and other serial input devices (e.g., a keyboard, keypad, and mouse). This can support updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touchscreen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
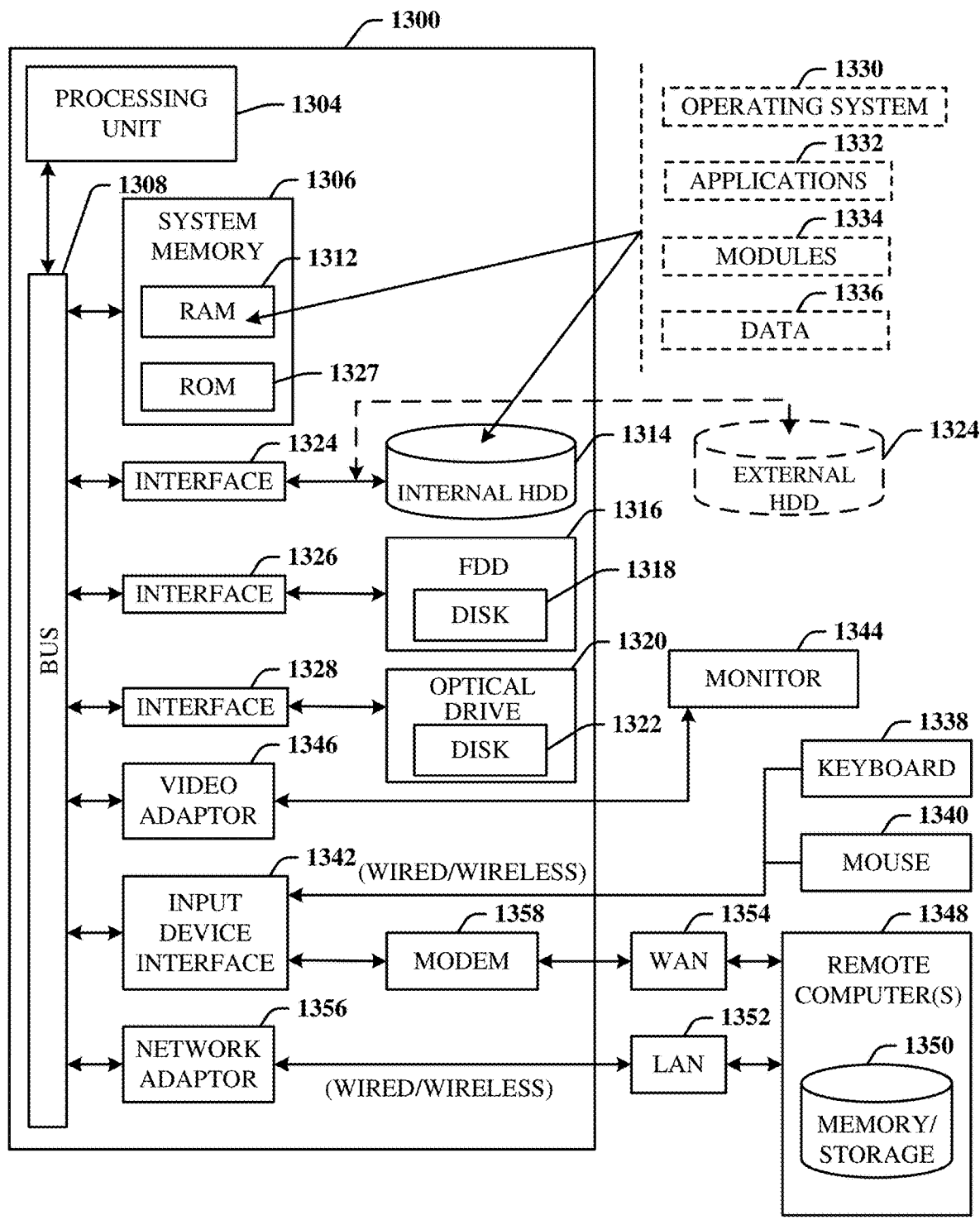
FIG. 13 illustrates an example block diagram of an example computer operable to engage in a system architecture that facilitates wireless communications according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) can include a microphone, an IR remote control, a joystick, a game pad, a stylus pen, touchscreen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1300 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration.

Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by network equipment comprising a processor, that a user equipment is able to support multiple hybrid automatic repeat request acknowledgments within a slot and is able to support ultra-reliable low-latency applications; and
   configuring, by the network equipment, the user equipment with a first replication factor for a first physical uplink control channel format and a second replication factor for a second physical uplink control channel format based on the ability of the user equipment to support the multiple hybrid automatic repeat request acknowledgements within a slot and the ultra-reliable low-latency applications.

2. The method of claim 1, further comprising:
   defining, by the network equipment, a group of resources for the user equipment based on a higher layer parameter resource group.

3. The method of claim 2, further comprising:
   indicating, by the network equipment, a number of resources in the group of resources based on a higher layer parameter resource group size; and
   transmitting, by the network equipment to the user equipment, resources in the group of resources via a higher layer parameter resource index.

4. The method of claim 2, further comprising:
   facilitating, by the network equipment, a transmission of an indication of the group of resources via radio resource signaling.

5. The method of claim 1, further comprising:
   configuring, by the network equipment, the user equipment with a maximum number of replication factors, wherein the maximum number of replication factors comprises at least the first replication factor and the second replication factor.

6. The method of claim 1, wherein the configuring comprises transmitting a downlink control channel configured to operate according to a fifth generation wireless network communication protocol.

7. A system, comprising:
   a processor; and
   a memory that stores executable instructions that, when executed by the processor, facilitate performance of operations, comprising:
      obtaining information related to a capability of a user equipment to support ultra-reliable low-latency applications and to support multiple hybrid automatic repeat request acknowledgements within a slot;
      configuring the user equipment with respect to control channel resources and a number of repetitions per slot based on the capability of the user equipment;
      indicating the control channel resources and the number of repetitions per slot to the user equipment via a control channel; and
      detecting an acknowledgement, from the user equipment, via an uplink control channel that comprises the control channel resources.

8. The system of claim 7, wherein the control channel resources are physical uplink control channel resources.

9. The system of claim 7, wherein the acknowledgement comprises a hybrid automatic repeat request acknowledgement.

10. The system of claim 9, wherein the configuring the user equipment comprises configuring the user equipment to cause the hybrid automatic repeat request acknowledgement to repeat over multiple time resources and multiple frequency resources.

11. The system of claim 7, wherein indicating the control channel resources comprises transmitting the control channel resources to the user equipment via a downlink control channel.

12. The system of claim 7, wherein the acknowledgement is a first acknowledgement, and wherein the control channel resources are first control channel resources, and wherein the operations further comprise:
   combining the first acknowledgement with at least a second acknowledgement received over second control channel resources, resulting in a combined acknowledgement; and
   based on the combined acknowledgement, facilitating an improvement of a reliability metric related to a reliability of the control channel.

13. The system of claim 7, wherein the control channel is a control channel configured to operate according to a fifth generation wireless network communication protocol.

14. A non-transitory machine-readable medium, comprising executable instructions that, when executed by a processor, facilitate performance of operations, comprising:
    determining that a user equipment is able to support multiple hybrid automatic repeat request acknowledgements within a slot and ultra-reliable low-latency applications; and
    configuring the user equipment with a first replication factor for a first physical uplink control channel format and a second replication factor for a second physical uplink control channel format, wherein the configuring is based on the ability of the user equipment to support the multiple hybrid automatic repeat request acknowledgements within a slot and the ultra-reliable low-latency applications.

15. The non-transitory machine-readable medium of claim 14, wherein the operations further comprise defining a group of resources for the user equipment based on a higher layer parameter resource group.

16. The non-transitory machine-readable medium of claim 15, wherein the operations further comprise:
    indicating a number of resources in the group of resources based on a higher layer parameter resource group size; and
    transmitting, to the user equipment, resources in the group of resources via a higher layer parameter resource index.

17. The non-transitory machine-readable medium of claim 15, wherein the operations further comprise transmitting to the user equipment an indication of the group of resources via radio resource signaling.

18. The non-transitory machine-readable medium of claim 14, wherein the operations further comprise configuring the user equipment with a maximum number of replication factors.

19. The non-transitory machine-readable medium of claim 18, wherein the maximum number of replication factors comprises at least the first replication factor and the second replication factor.

20. The non-transitory machine-readable medium of claim 14, wherein the control channel is a control channel configured to operate according to a fifth generation wireless network communication protocol.

* * * * *